United States Patent
Nagase et al.

(10) Patent No.: US 11,188,140 B2
(45) Date of Patent: Nov. 30, 2021

(54) INFORMATION PROCESSING SYSTEM

(71) Applicant: FUJIFILM BUSINESS INNOVATION CORP., Tokyo (JP)

(72) Inventors: Sho Nagase, Kanagawa (JP); Yoshiyuki Kobayashi, Kanagawa (JP); Shotaro Miyamoto, Kanagawa (JP); Hirohito Otake, Kanagawa (JP); Tatsutoshi Suwa, Kanagawa (JP); Hidenori Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 48 days.

(21) Appl. No.: 16/585,047

(22) Filed: Sep. 27, 2019

(65) Prior Publication Data

US 2020/0319697 A1 Oct. 8, 2020

(30) Foreign Application Priority Data

Apr. 5, 2019 (JP) .............................. JP2019-072861

(51) Int. Cl.
*G06F 1/3287* (2019.01)
*G06F 1/3234* (2019.01)
*G06F 15/80* (2006.01)

(52) U.S. Cl.
CPC .......... *G06F 1/3287* (2013.01); *G06F 1/3275* (2013.01); *G06F 15/80* (2013.01)

(58) Field of Classification Search
CPC .... G06F 1/3243; G06F 1/3287; G06F 1/3293; G06F 1/3203; G06F 1/324; G06F 1/3275; G06F 1/3253; G06F 1/3278; G06F 1/3284

USPC .................................. 713/300, 324, 320, 323
See application file for complete search history.

(56) References Cited

U.S. PATENT DOCUMENTS

| | | | | |
|---|---|---|---|---|
| 4,259,718 A | * | 3/1981 | Kaman | G06F 9/28 712/245 |
| 5,935,204 A | * | 8/1999 | Shimizu | G06F 12/0804 709/212 |
| 6,973,594 B2 | * | 12/2005 | Bennett | G06F 1/30 714/43 |
| 10,416,910 B1 | * | 9/2019 | Lai | G06F 3/0659 |
| 2003/0126377 A1 | * | 7/2003 | Orenstien | G06F 1/3237 711/146 |
| 2004/0068595 A1 | * | 4/2004 | Dieffenderfer | G06F 12/0831 710/105 |
| 2008/0104429 A1 | * | 5/2008 | Horvath | G06F 1/3203 713/300 |

(Continued)

FOREIGN PATENT DOCUMENTS

JP 2011-227598 A 11/2011

*Primary Examiner* — Faisal M Zaman
(74) *Attorney, Agent, or Firm* — Oliff PLC (57) ABSTRACT

An information processing system includes multiple processing units the number of which is at least three and multiple communication paths that allow the multiple processing units to mutually communicate information. When at least one of the multiple processing units is brought into a power-off state, multiple processing units that are included in the multiple processing units and that are other than the processing unit brought into the power-off state perform processing for changing one of the communication paths used by the multiple processing units other than the processing unit brought into the power-off state to a different one of the communication paths that has low power consumption.

6 Claims, 6 Drawing Sheets (56) References Cited

U.S. PATENT DOCUMENTS

| | | | |
|---|---|---|---|
| 2010/0299472 A1* | 11/2010 | Tanaka | G06F 9/4812 |
| | | | 710/269 |
| 2011/0106978 A1* | 5/2011 | Shishido | G06F 11/3055 |
| | | | 710/3 |
| 2013/0332764 A1* | 12/2013 | Juang | H04L 49/109 |
| | | | 713/324 |
| 2018/0150254 A1* | 5/2018 | Yang | G06F 1/3275 |
| 2018/0341441 A1* | 11/2018 | Kojima | G06F 3/1221 |
| 2020/0117519 A1* | 4/2020 | Chen | G06F 9/223 |

* cited by examiner

INFORMATION PROCESSING SYSTEM

CROSS-REFERENCE TO RELATED APPLICATIONS

This application is based on and claims priority under 35 USC 119 from Japanese Patent Application No. 2019-072861 filed Apr. 5, 2019.

BACKGROUND

(i) Technical Field

The present disclosure relates to an information processing system.

(ii) Related Art

Japanese Unexamined Patent Application Publication No. 2011-227598 discloses an information processing apparatus that allocates computer resources in a case where multiple operating systems are operated in one information processing apparatus. The computer resources are allocated in accordance with the use states of the respective computer resources when the operating systems are started.

SUMMARY

Aspects of non-limiting embodiments of the present disclosure relate to an information processing system enabled to reduce overall system power consumption when communications are performed between multiple processing units and when a power-off state occurs on any one of the processing units, as compared to a case where a communication path is not changed even when the power-off state occurs.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system including multiple processing units the number of which is at least three and multiple communication paths that allow the multiple processing units to mutually communicate information. When at least one of the multiple processing units is brought into a power-off state, multiple processing units that are included in the multiple processing units and that are other than the processing unit brought into the power-off state perform processing for changing one of the communication paths used by the multiple processing units other than the processing unit brought into the power-off state to a different one of the communication paths that has low power consumption.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described in detail with reference to the drawings.

Figure 1:
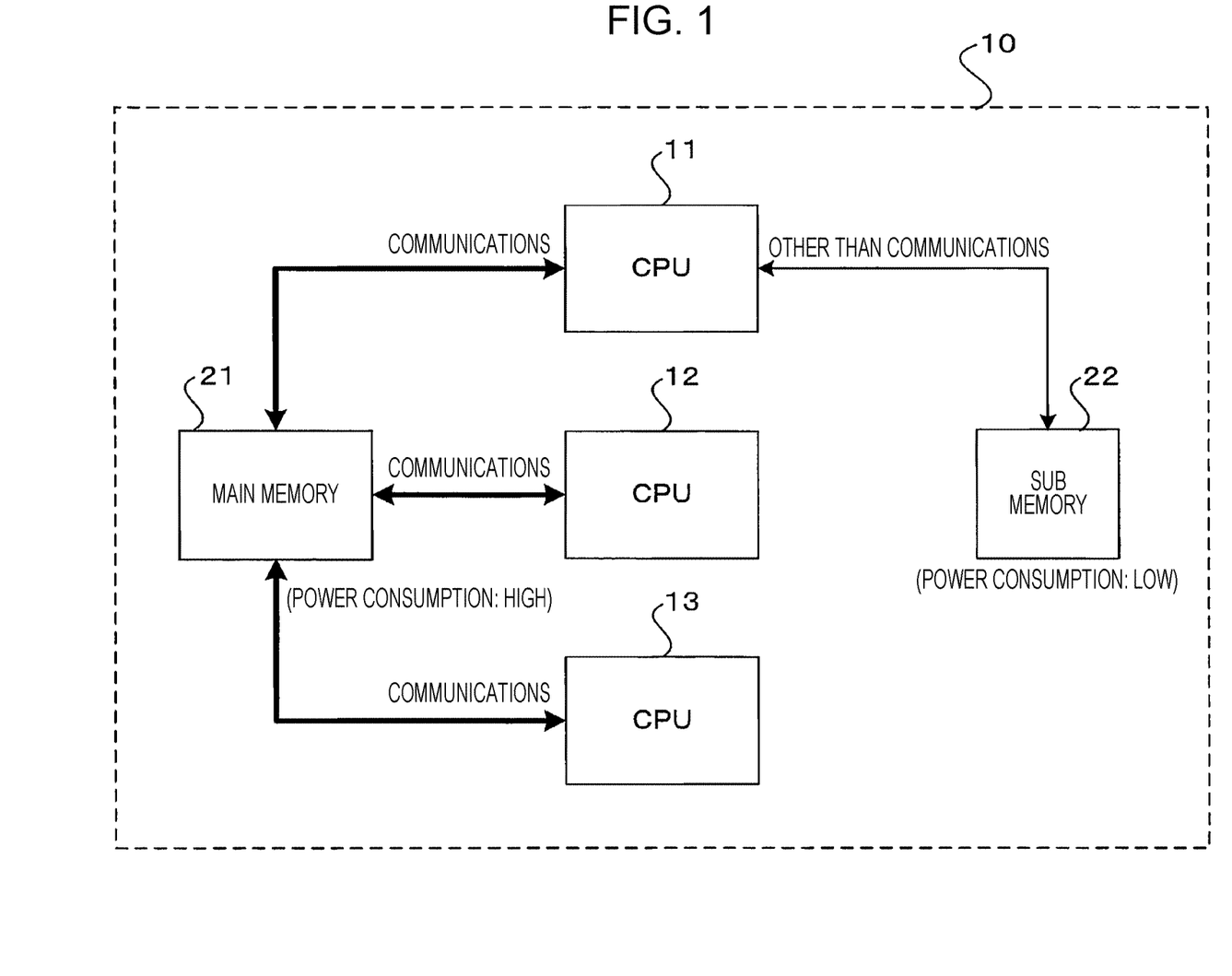
FIG. 1 is a diagram illustrating the system configuration of an information processing system according to an exemplary embodiment of the present disclosure.

FIG. 1 is a diagram illustrating the system configuration of an information processing system 10 according to an exemplary embodiment of the present disclosure.

The information processing system 10 in this exemplary embodiment includes three CPUs 11 to 13, a main memory 21, and a sub memory 22 as illustrated in FIG. 1.

The main memory 21 is configured as the shared memory of the three CPUs 11 to 13 and is a memory allowing direct memory access (DMA) transfer.

The sub memory 22 is used to store various pieces of data used by the CPU 11 in a normal operation mode.

The main memory 21 has a larger memory space and higher power consumption than the sub memory 22 does.

Each of the three CPUs 11 to 13 writes, to an area with a specific address of a memory included in a communication path, information intended to be transmitted to a different one of the three CPUs 11 to 13, and the different CPU reads out the information written to the area with the specific address of the memory and thereby performs communications between the multiple CPUs 11 to 13 via the memory.

The CPUs 11 to 13 perform communications to mutually communicate information by using the main memory 21 in the normal operation mode.

Figure 2:
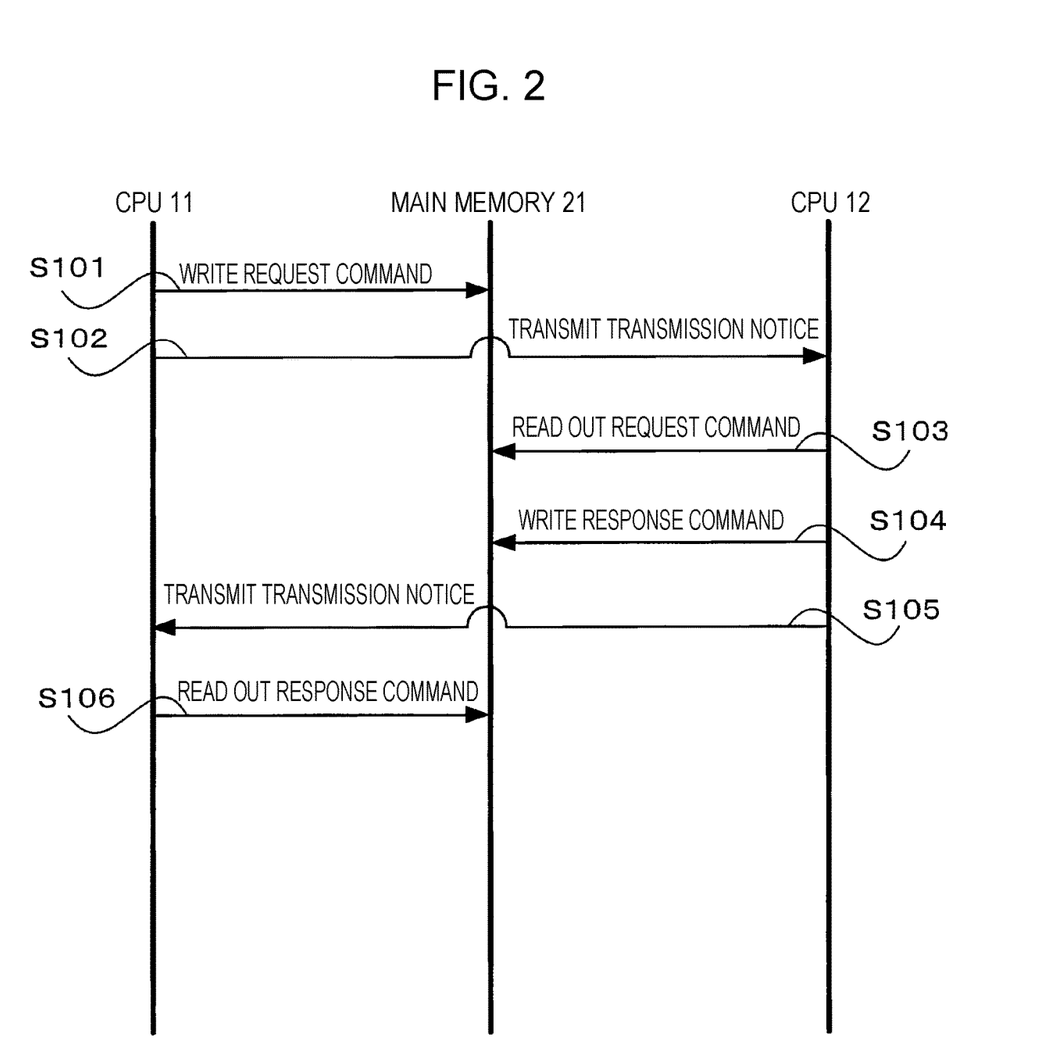
FIG. 2 is a sequence chart for explaining processing performed when a first processing unit (hereinafter, abbreviated as a CPU) and a second CPU perform communications via a main memory.

For example, processing performed when the CPUs 11 and 12 perform communications via the main memory 21 will be described with reference to a sequence chart in FIG. 2.

First, in step S101, the CPU 11 writes a request command intended to be transmitted to the CPU 12 to a specific area of the main memory 21. In step S102, the CPU 11 transmits, to the CPU 12, a transmission notice indicating that the request command is written.

In step S103, the CPU 12 receiving the transmission notice from the CPU 11 reads out the request command written to the specific area of the main memory 21.

In step S104, the CPU 12 writes a response command to a specific area of the main memory 21 in response to the read out request command.

In step S105, the CPU 12 transmits, to the CPU 11, a transmission notice indicating that the response command is written.

In step S106, the CPU 11 receiving the transmission notice from the CPU 12 reads out the response command written to the specific area of the main memory 21.

The request command and the response command are transmitted and received in this manner between the CPU 11 and the CPU 12 via the main memory 21.

Note that like the CPU 11, the CPUs 12 and 13 have the configuration allowing access to the sub memory 22, and thus the CPUs 11 to 13 are also capable of performing communications via the sub memory 22 from the viewpoint of the configuration. However, the sub memory 22 has a smaller memory space and a low data transfer rate than the main memory 21 does. Accordingly, it is not possible in reality to perform communications between the three CPUs 11 to 13 via the sub memory 22.

In apparatuses and systems in recent years, reducing power consumption as much as possible is desired. Not only simply switching between an on state and an off state of the power of an apparatus or the entire system but also, for example, reducing even a little amount of power consumption is performed in such a manner that multiple stepwise operation modes are provided for reducing power consumption, and switching between the operation modes is performed in accordance with the condition.

Specifically, if there are the three CPUs 11 to 13 like the information processing system 10 in this exemplary embodiment, for example, there is a case where system power consumption is reduced by, for example, a power saving mode (or an energy saving mode) in which the CPU 11 is brought into a power-off state to stop operation and only the CPUs 12 and 13 are in a power-on state.

Figure 3:
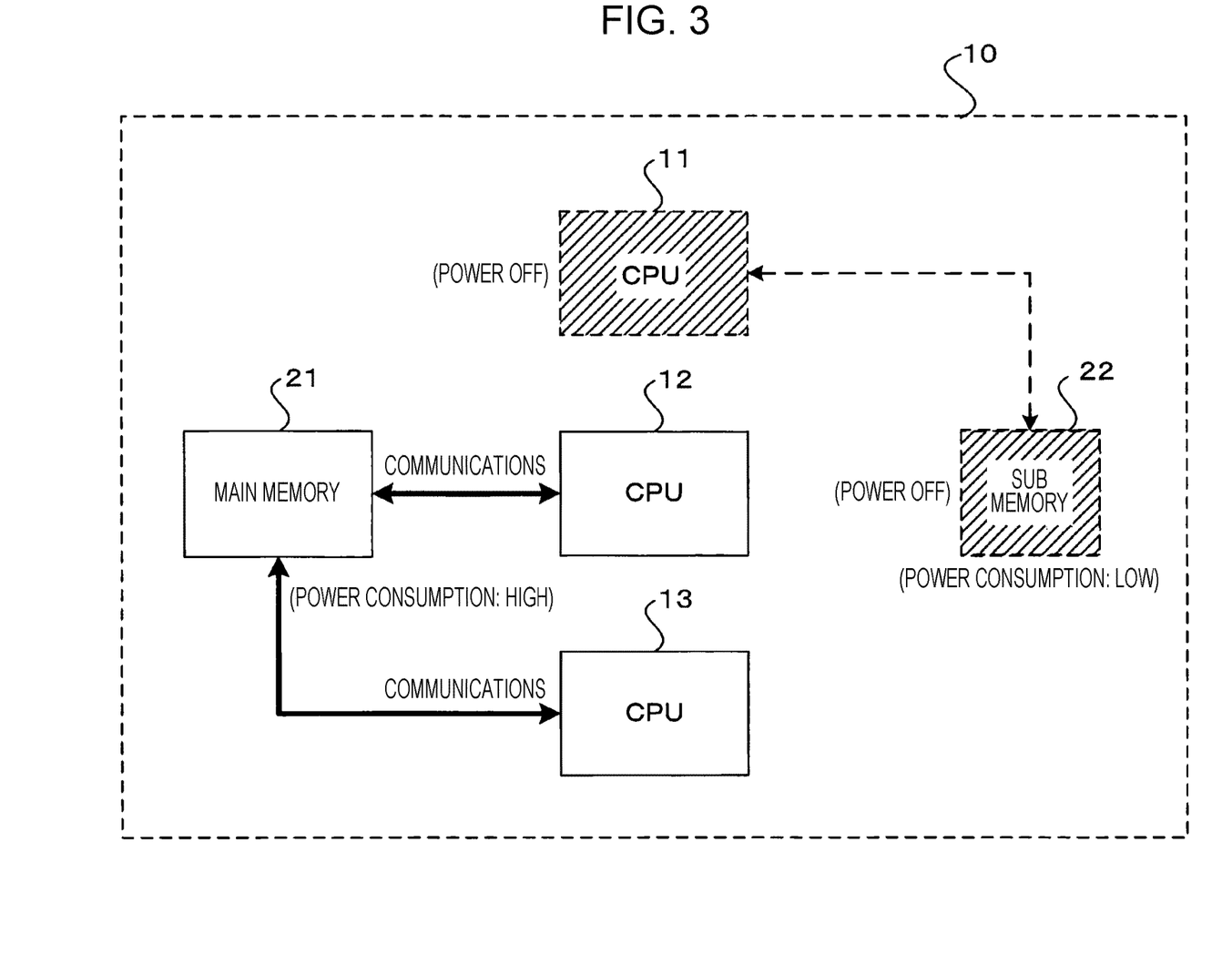
FIG. 3 is a diagram illustrating a case where the first CPU is simply brought into a power-off state in an unchanged communication path state without changing a communication path for inter-CPU communications.

FIG. 3 illustrates a case where, in the case as above, the CPU 11 is simply brought into the power-off state in an unchanged communication path state without changing a communication path for inter-CPU communications.

FIG. 3 illustrates the state where the communication path between the CPUs 12 and 13 is still a communication path including the main memory 21 in the power saving mode in which, for example, the CPU 11 is brought into the power-off state.

In FIG. 3, the CPU 11 is brought into the power-off state, and thus the sub memory 22 used by the CPU 11 is also brought into the power-off state. The CPUs 12 and 13 mutually perform communications via the main memory 21.

Note that the power-off state includes not only a state where power supply is disconnected but also, for example, a state where power is supplied, a normal operation is not performed, and power consumption is lower than that in a normal operation state.

In FIG. 3, since the CPU 11 is brought into the power-off state, it suffices that the CPU 12 may communicate with only the CPU 13 and the CPU 13 may communicate with only the CPU 12.

To perform communications between the two CPUs 12 and 13, the main memory 21 having a large memory space is not needed, and communications between the CPUs 12 and 13 may be performed by using the sub memory 22.

For example, in a case where a high communication speed is not desired in the communications between the CPUs 12 and 13, the use of even the sub memory 22 having a low data transfer rate, instead of the main memory 21 with a high data transfer rate, may achieve a communication speed needed for the communications between the CPUs 12 and 13.

Figure 4:
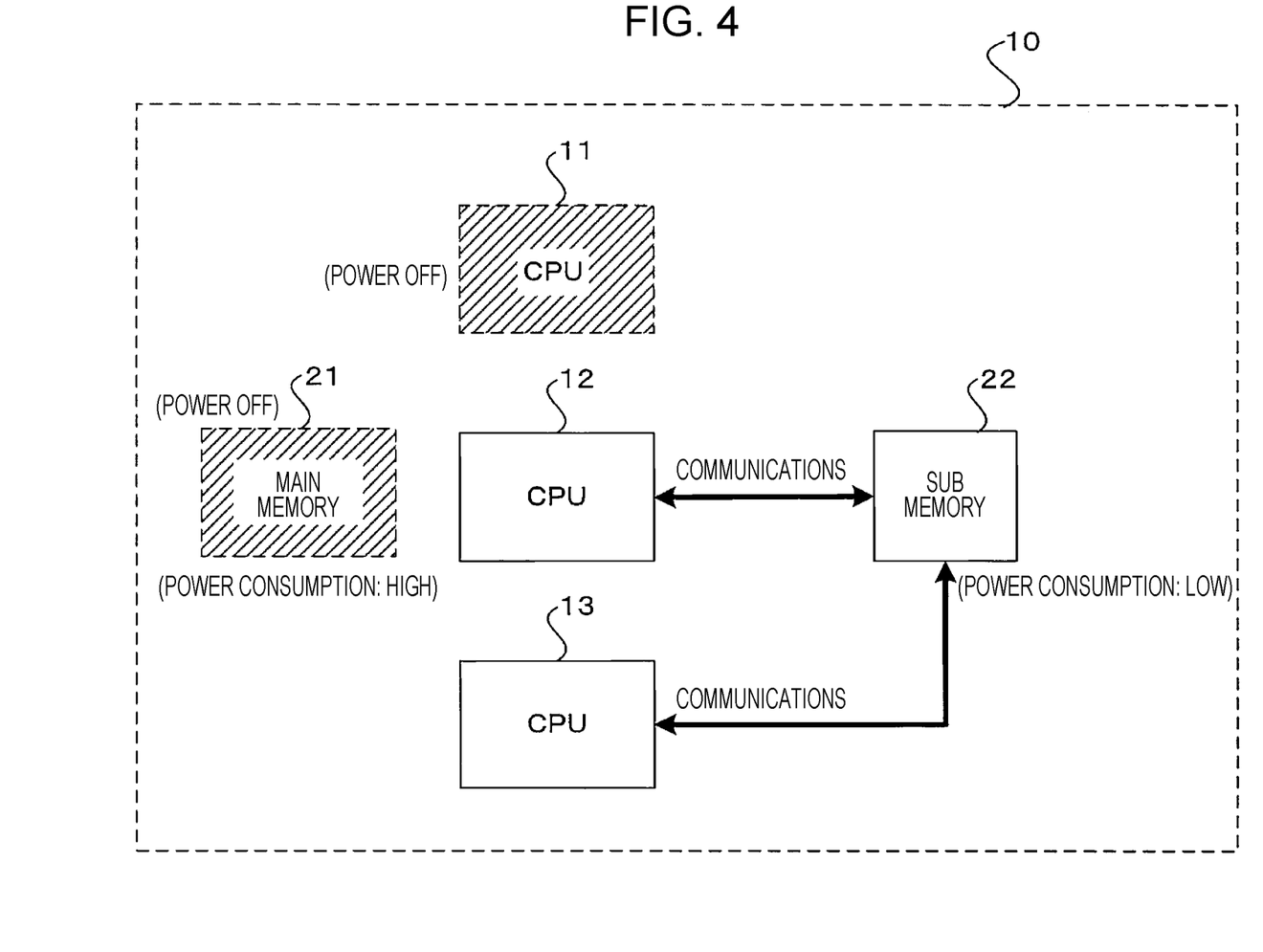
FIG. 4 is a diagram illustrating a case where the communication path for the inter-CPU communications is changed in a power saving mode in which the first CPU comes into the power-off state.

In the case as above, in the power saving mode where the CPU 11 is brought into the power-off state, the communication path for the communications between the CPUs 12 and 13 is changed from the communication path including the main memory 21 to a communication path including the sub memory 22 to bring the main memory 21 into the power-off state as illustrated in FIG. 4, and thereby power consumption is reduced more.

Specifically, in comparison between the case where the communication path is not changed as illustrated in FIG. 3 and the case where the communication path is changed as illustrated in FIG. 4, it is understood that in the case illustrated in FIG. 4, the power consumption is further reduced by a difference in power consumption between the sub memory 22 and the main memory 21.

As described above, the information processing system 10 in this exemplary embodiment includes the multiple communication paths allowing the multiple CPUs to mutually communicate information. In a case where at least one of the three CPUs 11 to 13 is brought into the power-off state, for example, the two CPUs 12 and 13 that are other than the CPU 11 brought into the power-off state and that are included in the three CPUs 11 to 13 perform processing for changing the communication path used by the CPUs 12 and 13 to the communication path having low power consumption.

Note that the multiple communication paths in this exemplary embodiment are communication paths including two memories respectively having different amounts of power consumption, that is, the main memory 21 and the sub memory 22.

The two CPUs 12 and 13 that are other than the CPU 11 brought into the power-off state and that are included in the three CPUs 11 to 13 change the communication path including the main memory 21 to the communication path including the sub memory 22 having power consumption lower than that of the main memory 21.

Note that in the power saving mode, the CPUs 12 and 13 change the communication path to, for example, a communication path that ensures any one of a communication speed and a communication data capacity that are needed for the inter-CPU communications.

Specifically, for example, even in the power saving mode, but if a high communication speed or a large amount of communication data is desired in the inter-CPU communications, the CPUs 12 and 13 do not change the communications through the communication path including the sub memory 22 but keeps the communications through the communication path including the main memory 21.

Note that any one of the CPUs 12 and 13 transmits a response through the communication path yet to be changed and including the main memory 21 in a communication from a CPU different from the CPU 12 or 13 through the communication path yet to be changed and including the main memory 21 before the CPU 11 is brought into the power-off state after the occurrence of an event of transition to power saving (hereinafter, referred to as a power-saving transition event).

However, if a communication is received from the different CPU through the communication path yet to be changed and including the main memory 21 before the CPU 11 is brought into the power-off state, that is, before the power-saving transition event occurs, but if the communication is based on a specific command that needs a period of time longer than or equal to a period of time set in advance to respond to the received communication, any one of the CPUs 12 and 13 transmits BUSY once back to the different CPU having transmitted the specific command and requests retransmission.

Upon completion of all of communications through the communication path yet to be changed and including the main memory 21, the CPUs 12 and 13 bring the communication path yet to be changed, that is, the main memory 21 into the power-off state. If the main memory 21 is brought into the power-off state before the completion of all of the communications through the communication path yet to be changed and including the main memory 21, there is a possibility that the request command and the response command that are written to the main memory 21 disappear.

Note that after the occurrence of the power-saving transition event, new communications are performed through the communication path including the sub memory 22.

Figure 5:
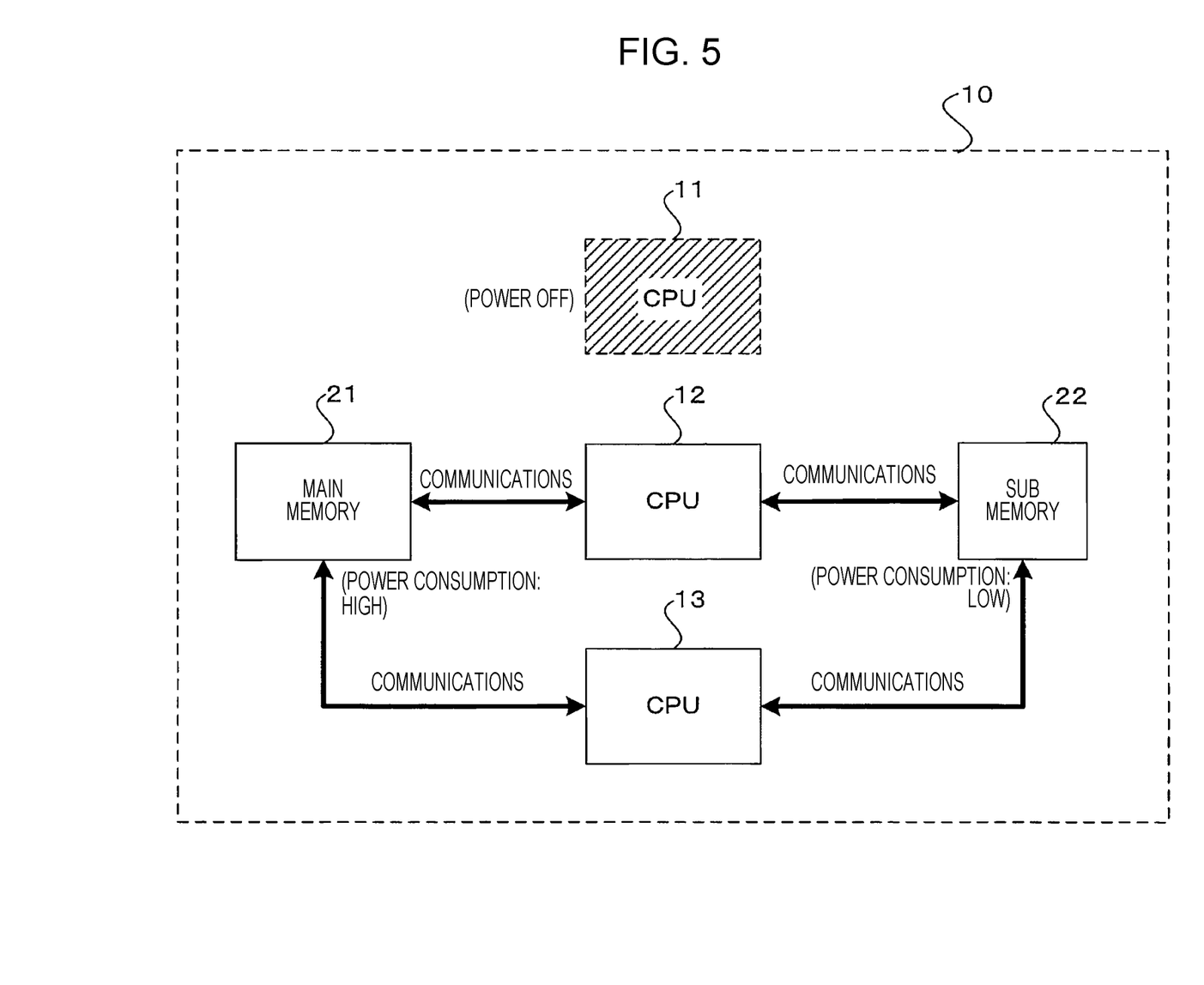
FIG. 5 is a diagram illustrating a state in the course of transition from a normal operation mode illustrated in FIG. 1 to the power saving mode illustrated in FIG. 4.

FIG. 5 illustrates a state in the course of transition from the normal operation mode illustrated in FIG. 1 to the power saving mode illustrated in FIG. 4.

After the CPU 11 is brought into the power-off state as described above, but if communications through the communication path including the main memory 21 have not been completed, the information processing system 10 in this exemplary embodiment does not bring the main memory 21 into the power-off state until the communications via the main memory 21 are complete.

If new communications occur after a power-saving transition event occurs and then the CPU 11 is brought into the power-off state in the information processing system 10 in this exemplary embodiment, the new communications are performed through the communication path including the sub memory 22.

Accordingly, while the normal operation mode is transitioning to the power saving mode, as illustrated in FIG. 5, there is a possibility of occurrence of a state in which both of the two communication paths that are the communication path including the main memory 21 and the communication path including the sub memory 22 are used.

Figure 6:
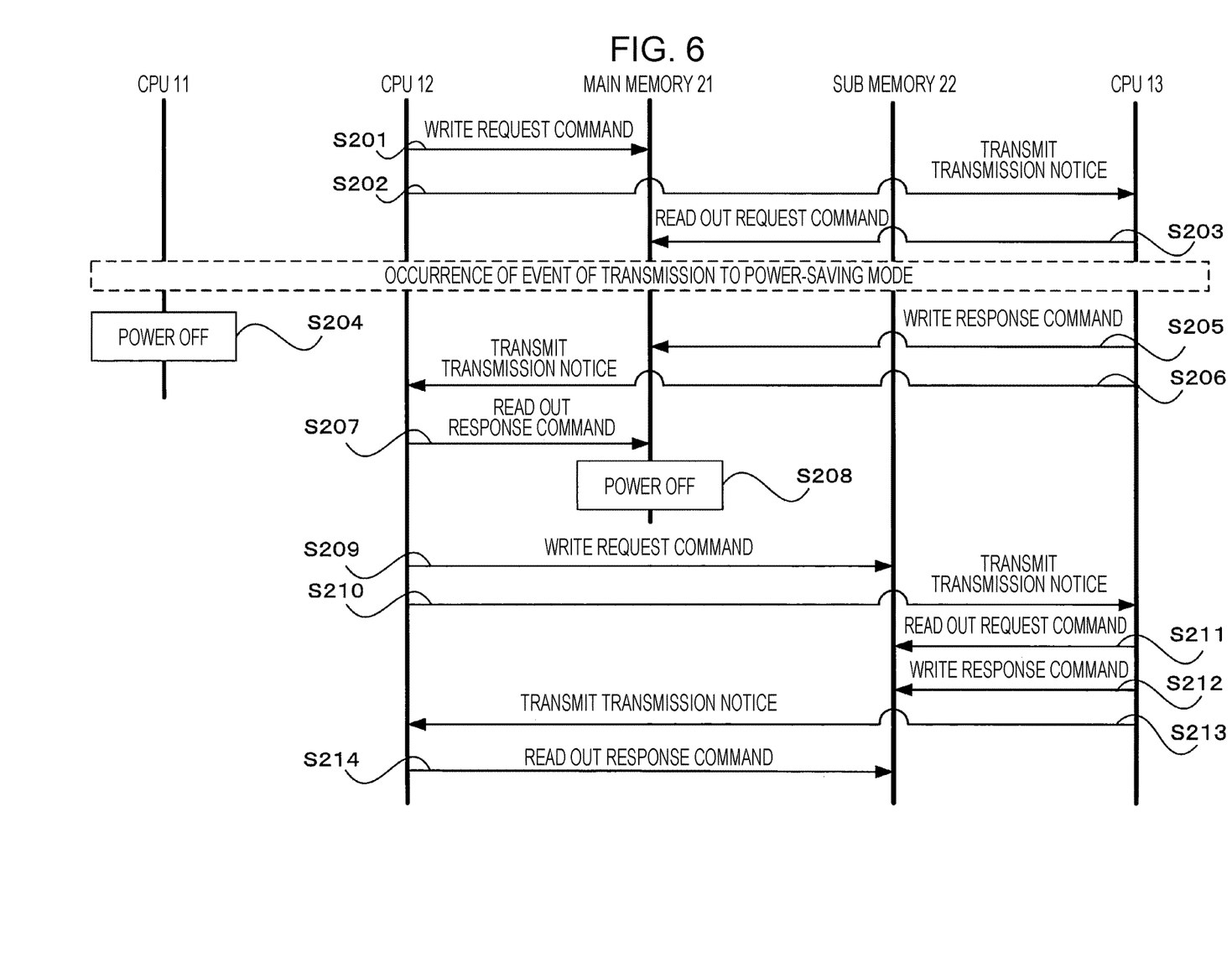
FIG. 6 is a sequence chart for explaining processing performed in a case where communications via the main memory have not been completed when a power saving event occurs.

Processing performed in a case where the communications via the main memory 21 have not been completed when a power saving event occurs will be described with reference to a sequence chart in FIG. 6.

First, in step S201, the CPU 12 writes a request command intended to be transmitted to the CPU 13 to a specific area of the main memory 21. In step S202, the CPU 12 transmits, to the CPU 13, a transmission notice indicating that the request command is written.

In step S203, the CPU 13 receiving the transmission notice from the CPU 12 reads out the request command written to the specific area of the main memory 21.

Description is provided on the assumption that, for example, a power-saving transition event occurs in the state as above. In the power-saving transition event, the normal operation mode transitions to the power saving mode.

When the power-saving transition event occurs, the CPU 11 is brought into the power-off state in step S204. However, communications between the CPU 12 and the CPU 13 via the main memory 21 have not been completed, and thus the main memory 21 does not come into the power-off state immediately.

To reply to the CPU 12, the CPU 13 generates a response command for replying to the request command received from the CPU 12. The CPU 13 has received the request command through the communication path including the main memory 21 and thus writes the generated response command to a specific area of the main memory 21 in step S205. In step S206, the CPU 13 transmits, to the CPU 13, a transmission notice indicating that the request command is written.

In step S207, the CPU 12 receiving the transmission notice from the CPU 13 reads out the response command written to the specific area of the main memory 21.

Since a queue for communications via the main memory 21 that use the old communication path before the change is evacuated, the main memory 21 is brought into the power-off state in step S208.

After the communication path between the CPU 12 and the CPU 13 is changed from the communication path including the main memory 21 to the communication path including the sub memory 22 in this manner, the communications between the CPU 12 and the CPU 13 are performed through the communication path including the sub memory 22.

Specifically, if the CPU 12 is to transmit a request command to the CPU 13, the CPU 12 writes the request command intended to be transmitted to the CPU 13 to a specific area of the sub memory 22 in step S209. In step S210, the CPU 12 transmits, to the CPU 13, a transmission notice indicating that the request command is written.

In step S211, the CPU 13 receiving the transmission notice from the CPU 12 reads out the request command written to the specific area of the sub memory 22.

In step S212, the CPU 13 writes a response command to a specific area of the sub memory 22 in response to the read out request command.

In step S213, the CPU 13 transmits, to the CPU 12, a transmission notice indicating that the response command is written.

In step S214, the CPU 12 receiving the transmission notice from the CPU 13 reads out the response command written to the specific area of the sub memory 22.

Modification

Note that the exemplary embodiment has heretofore been described by using the case where the present disclosure is applied to the information processing system 10 including the three CPUs 11 to 13; however, the present disclosure is likewise applicable to any information processing system including multiple CPUs the number of which is at least three.

The exemplary embodiment has heretofore been described by using the case of, for example, the configuration in which the multiple CPUs mutually communicate information through the communication path including the shared memory; however, the present disclosure is not limited to this. The present disclosure is likewise applicable to, for example, a configuration in which the multiple CPUs mutually communicate information through a different communication path. For example, the present disclosure is likewise applicable to a configuration in which the multiple CPUs mutually communicate information by using such a hardware circuit that is referred to as a universal asynchronous receiver transmitter (UART).

That is, the present disclosure is likewise applicable to any configuration allowing three or more CPUs to mutually perform communications through multiple communication paths using pieces of hardware respectively having different amounts of power consumption.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
   a first communication path having a first memory;
   a second communication path having a second memory with lower power consumption than the first memory;
   at least three processing units that mutually communicate information using the first and second communication paths, the at least three processing units being configured such that:
      when a first processing unit of the at least three processing units is brought into a power-off state, a plurality of the at least three processing units other than the first processing unit perform processing for switching from the first communication path to the second communication path for communication among the at least three processing units; and
      a second processing unit of the at least three processing units is configured to transmit a response to a communication received from a third processing unit of the at least three processing units, the communication being received through the first communication path before occurrence of the power-off state of the first processing unit.

2. The information processing system according to claim 1,
   wherein each of the at least three processing units is configured to write, to an area with a specific address of one of the first and second memories, information intended to be transmitted to another one of the at least three processing units, and the other processing unit is configured to read out the information written to the area with the specific address and perform a communication via the one memory between the at least three processing units.

3. The information processing system according to claim 1,
   wherein if the second processing unit receives the communication from the third processing unit through the first communication path before the occurrence of the power-off state of the first processing unit, but if the received communication needs a period of time longer than or equal to a period of time set in advance to reply to the communication, the second processing unit is configured to request the third processing unit to perform retransmission.

4. The information processing system according to claim 1,
   wherein upon completion of all of communications performed through the first communication path, the second and third processing units are configured to bring the first communication path into the power-off state.

5. The information processing system according to claim 3,
   wherein upon completion of all of communications performed through the first communication path, the second and third processing units are configured to bring the first communication path into the power-off state.

6. An information processing system comprising:
   a first communication path having a first memory;
   a second communication path having a second memory with lower power consumption than the first memory;
   at least three processing means that mutually communicate information using the first and second communication paths, the at least three processing means being configured such that:
      when a first processing means of the at least three processing means is brought into a power-off state, a plurality of the at least three processing means other than the first processing means perform processing for switching from the first communication path to the second communication path for communication among the at least three processing means; and
      a second processing means of the at least three processing means is configured to transmit a response to a communication received from a third processing means of the at least three processing means, the communication being received through the first communication path before occurrence of the power-off state of the first processing means.

* * * * *